(12) United States Patent
Runfola

(10) Patent No.: US 12,522,134 B2
(45) Date of Patent: Jan. 13, 2026

(54) MOTOR-VEHICLE INTERIOR COMPONENT WITH A BACKLIT DECORATIVE PANEL

(71) Applicant: Stellantis Europe S.p.A., Turin (IT)

(72) Inventor: Lorenzo Runfola, Turin (IT)

(73) Assignee: Stellantis Europe S.p.A., Turin (IT)

(*) Notice: Subject to any disclaimer, the term of this patent is extended or adjusted under 35 U.S.C. 154(b) by 0 days.

(21) Appl. No.: 18/842,134

(22) PCT Filed: Mar. 8, 2023

(86) PCT No.: PCT/IT2023/050066
§ 371 (c)(1),
(2) Date: Aug. 28, 2024

(87) PCT Pub. No.: WO2023/187843
PCT Pub. Date: Oct. 5, 2023

(65) Prior Publication Data
US 2025/0178525 A1    Jun. 5, 2025

(30) Foreign Application Priority Data

Mar. 28, 2022 (IT) .................. 102022000006017

(51) Int. Cl.
*B60Q 3/14* (2017.01)
*B60Q 3/18* (2017.01)
*B60Q 3/54* (2017.01)
*B60Q 3/64* (2017.01)

(52) U.S. Cl.
CPC .............. *B60Q 3/14* (2017.02); *B60Q 3/18* (2017.02); *B60Q 3/54* (2017.02); *B60Q 3/64* (2017.02)

(58) Field of Classification Search
CPC ... B60Q 3/14; B60Q 3/54; B60Q 3/64; B60Q 3/18

USPC ......................................................... 362/489
See application file for complete search history.

(56) References Cited

U.S. PATENT DOCUMENTS

| 11,237,318 B1* | 2/2022 | Mertens ............... G02B 6/0036 |
| 2012/0032592 A1* | 2/2012 | Breunig .................... B60Q 3/14 |
| | | 315/77 |
| 2012/0200475 A1* | 8/2012 | Baker .................... H01H 9/181 |
| | | 345/4 |
| 2021/0268907 A1* | 9/2021 | Zimmermann ........ B60K 35/21 |

FOREIGN PATENT DOCUMENTS

| DE | 102015214247 A1 * | 2/2017 | ....... B29C 45/14688 |
| DE | 102018119967 A1 * | 2/2019 | ................ F21V 3/06 |
| DE | 102020117815 A1 * | 1/2022 | ............. B60K 35/80 |

OTHER PUBLICATIONS

EPO International Search Report and Written Opinion based on PCT/IT2023/050066, dated May 2, 2023, 11 pages.

* cited by examiner

*Primary Examiner* — Laura K Tso
(74) *Attorney, Agent, or Firm* — Heslin Rothenberg Farley and Mesiti P.C.; Victor A. Cardona, Esq.

(57) ABSTRACT

A motor-vehicle interior component includes a decorative panel formed by a shaped body of plastic material, having a visible surface at least partially transparent to light, the back of which is associated with a support layer having on a first face facing the visible surface a first aesthetic pattern, and on a second opposite face a second aesthetic pattern. The component also includes backlighting means associated with the back of the decorative panel, which can be activated to illuminate said second aesthetic pattern.

17 Claims, 5 Drawing Sheets

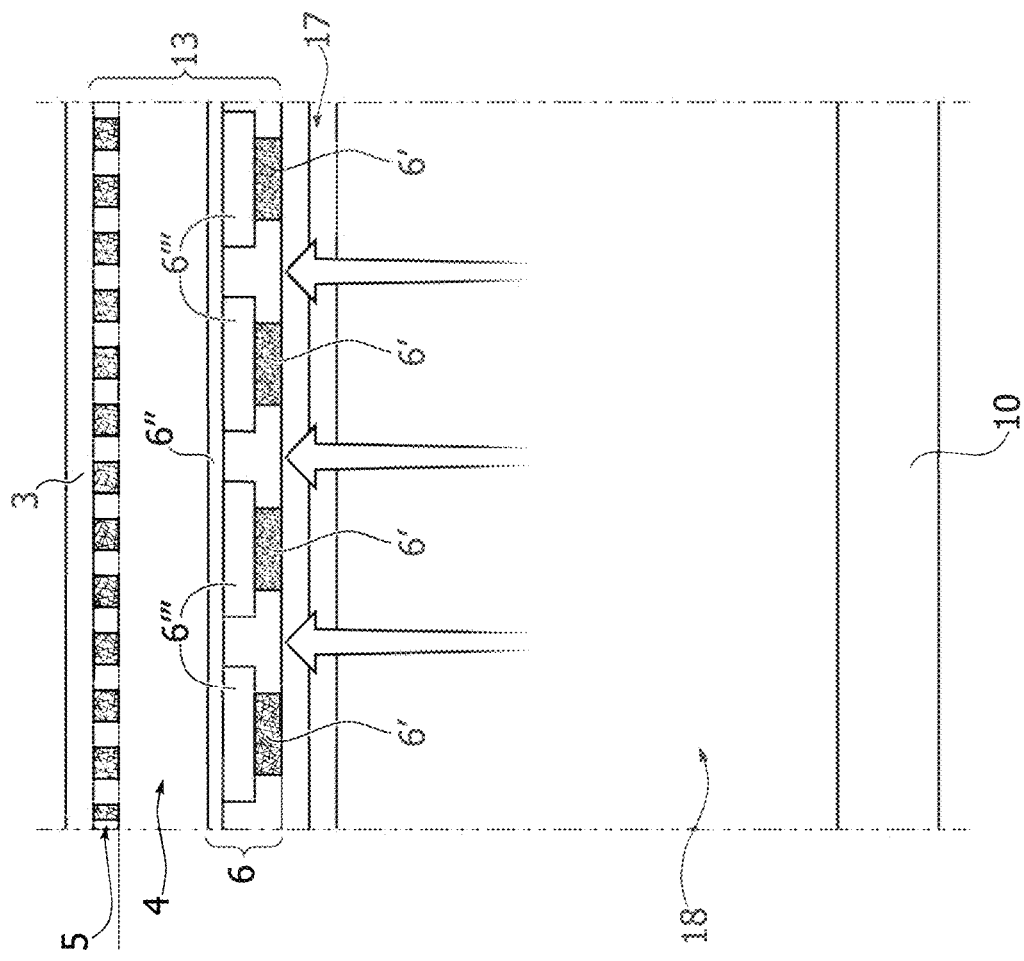

MOTOR-VEHICLE INTERIOR COMPONENT WITH A BACKLIT DECORATIVE PANEL

CROSS REFERENCE TO RELATED APPLICATIONS

Figure 1:
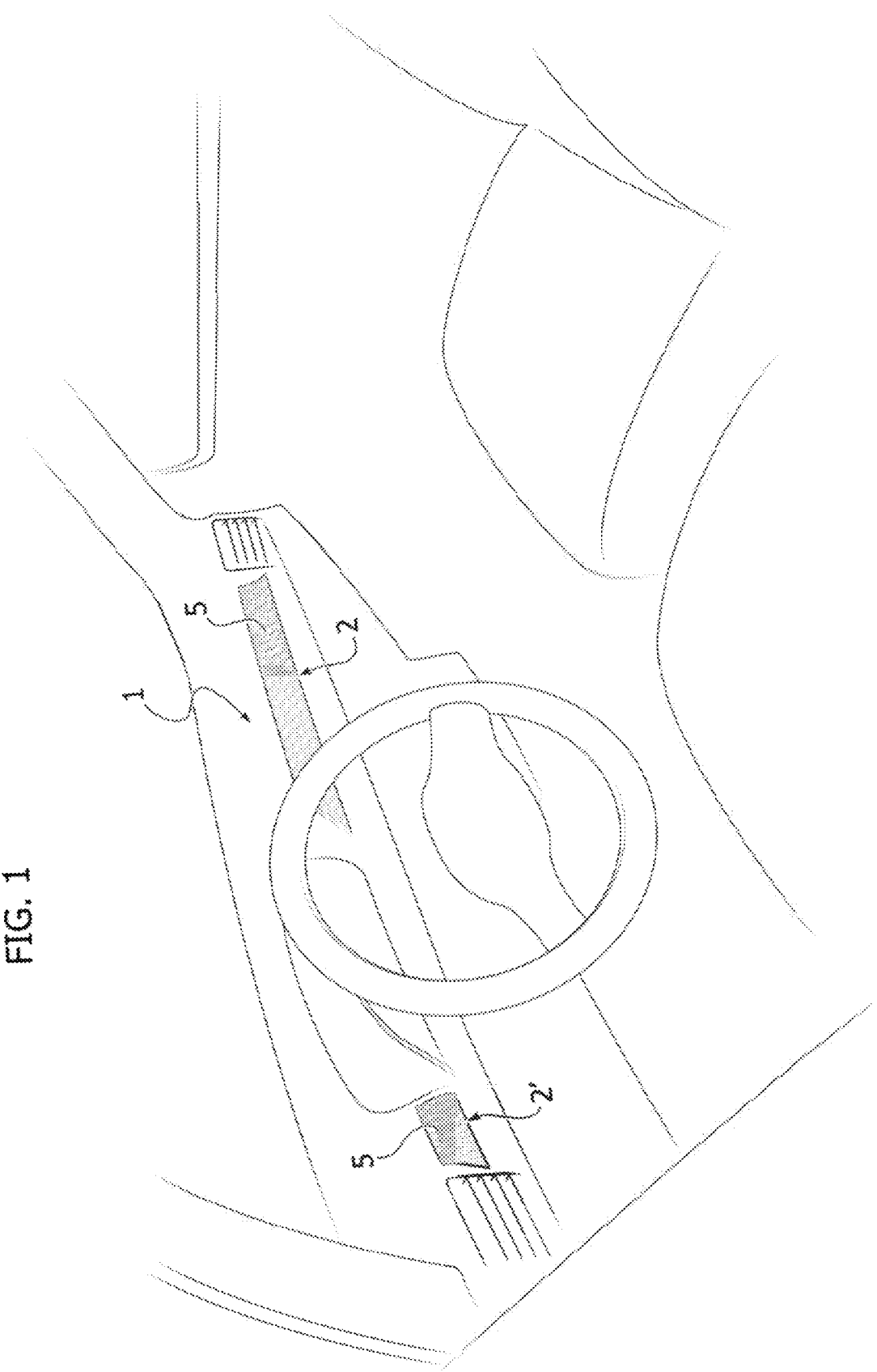

This application is a national stage filing under Section 371 of International Application No. PCT/IT2023/050066, filed Mar. 8, 2023, published in English on Oct. 5, 2023, as WO 2023/187843 A1 and which claims priority from Italian Patent Application No. 102022000006017 filed on Mar. 28, 2022, the entire disclosures of which are incorporated herein by reference.

FIELD OF THE INVENTION

The present invention relates in general to motor-vehicle interiors, and in particular it relates to the production of a motor-vehicle interior component comprising a decorative panel.

The present invention finds advantageous, although not exclusive, application in the manufacture of a motor-vehicle instrument panel, to which the following description will refer without thereby losing generality. In particular, the present invention may be used to make other aesthetic/functional components of a motor-vehicle interior, such as for example a door panel and a central console-tunnel.

PRIOR ART

In the field of motor-vehicle interiors, various structural/functional components are often equipped with decorative finishing elements, which frontally have coatings of various materials that are particularly pleasing to the eye and/or to the touch.

These decorative elements are generally of a thin thickness and with a development mainly conforming to the dimensions of the structural/functional object covered; in the field in question, by way of example, extensive use is made of decorative strips/escutcheons which are visually integrated at the dashboard, the central tunnel, or even the inner lining panels of the side doors giving access to the passenger compartment.

These decorative aesthetic elements may be characterized by a specific surface conformation which varies according to the component on which they are applied, for example a particular color, material and/or finish able to give a particular style or value to the passenger compartment. To this end, we recall the well-known and widespread coating with precious woods, to give the passenger compartment an aspect of particular elegance, or chrome plating to ensure a more sporty character.

In some motor-vehicle models, nighttime auxiliary lighting sources are sometimes used, i.e. not intended to replace traditional light sources, configured to generate an ambient and atmospheric light that allows improvement of the perception of the inner space as well as the recognition and identification of objects and controls inside the passenger compartment, without however disturbing the driver's vision towards the outside. The document WO2019223989 describes a solution of this type.

The present invention starts from the requirement to propose a motor-vehicle interior component having a decorative panel, which is particularly attractive to the touch and sight, and at the same time simple to produce.

OBJECT OF THE INVENTION

The object of the present invention is to make available inside the passenger compartment of a motor vehicle, a component bearing a decorative solution which is particularly attractive to the eye and to the touch, and at the same time simple to produce.

A further object of the invention is to provide this solution in a way that can be customized by the user, according to the conditions outside the passenger compartment and/or the dynamic conditions of the motor-vehicle.

Another object of the invention is that of achieving the aforesaid objective with a simple method to implement that is inexpensive.

SUMMARY OF THE INVENTION

According to one or more embodiments, one or more of the above-mentioned objects are achieved through a motor-vehicle interior component having the characteristics specifically set forth in the attached claim 1.

In particular, the invention relates to a motor-vehicle interior component comprising:
a decorative panel formed by a shaped body of plastic material,
wherein the decorative panel has a visible surface at least partially transparent to light, the back of which is associated with a support layer, having a first aesthetic pattern on a first face facing the visible surface, and a second aesthetic pattern on a second face opposite to said first face,
wherein the visible surface, the first and the second aesthetic patterns and the support layer define a configuration of multi-layer materials comprising ink layers deposited on the support layer,
wherein the first and second aesthetic patterns and the support layer form a film with dark, light-blocking portions and transparent portions wherein light can pass through,
backlighting means associated with the back of the decorative panel, which can be activated to illuminate said second aesthetic pattern,
in such a way that said first aesthetic pattern and said second aesthetic pattern are alternatively displayed from the outside of the component depending on whether the backlighting means are deactivated or activated.

The first aesthetic pattern is obtained by depositing an opaque ink layer on the first face of the support layer. The second aesthetic pattern is obtained through the composition of several superimposed layers of ink.

In one or more embodiments, the visible surface associated with the first aesthetic pattern confers a "metallic" type appearance and a "haptic" type of tactile feedback, or rather, rough on contact.

In one or more embodiments, the backlighting means comprise at least one light source connected to at least one light guide body associated with the back of the shaped body forming the decorative panel.

The embodiments also relate to a method for making a motor-vehicle dashboard according to the characteristics mentioned above.

Further characteristics of the invention are defined in the attached claims and in the detailed description that follows.

DETAILED DESCRIPTION OF MORE EMBODIMENTS

Figure 2:
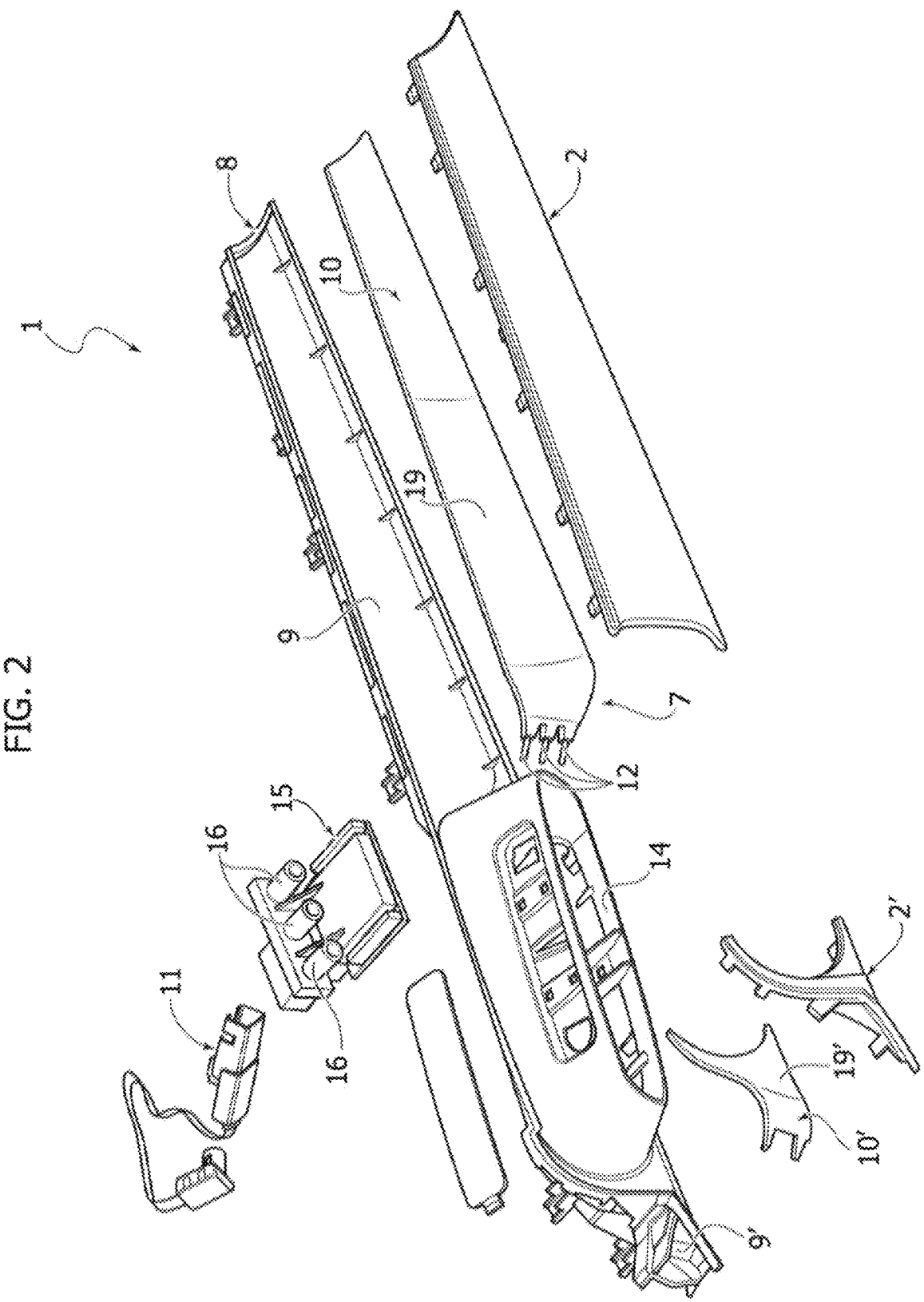
Figure 3:
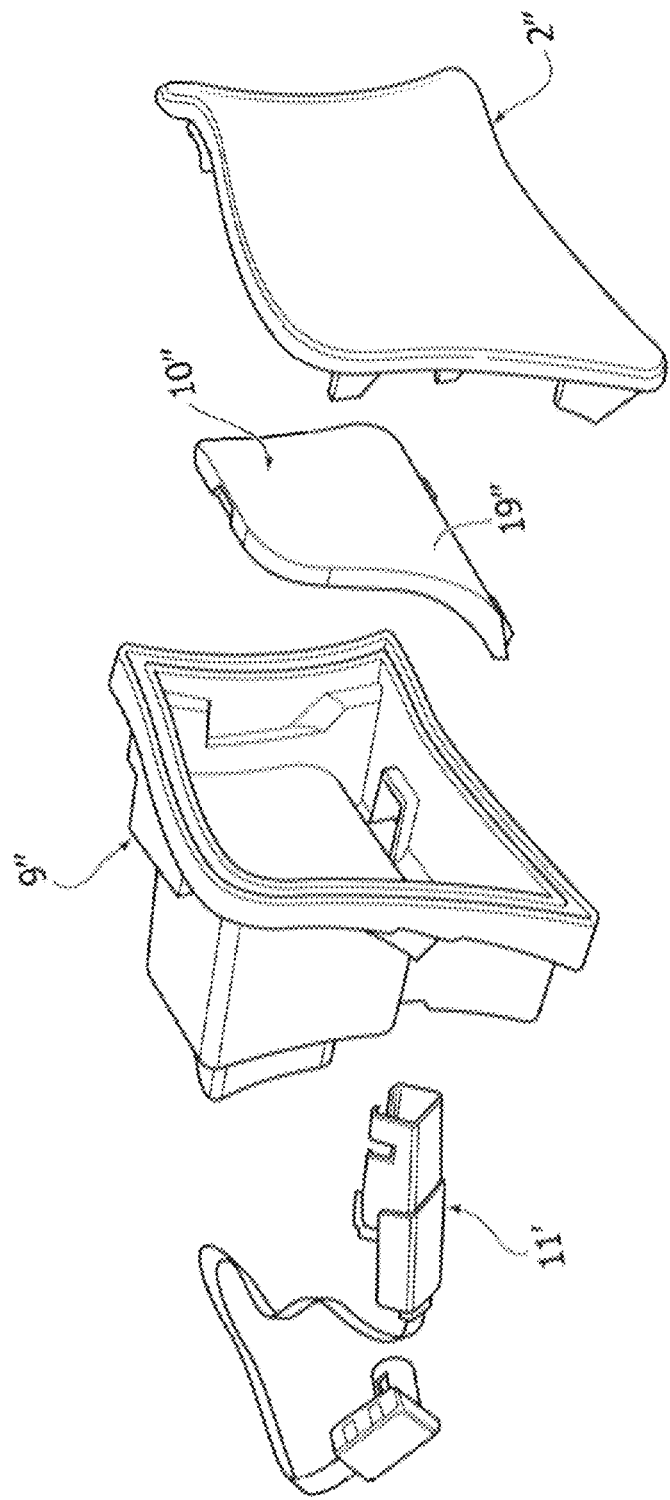
Figure 7:
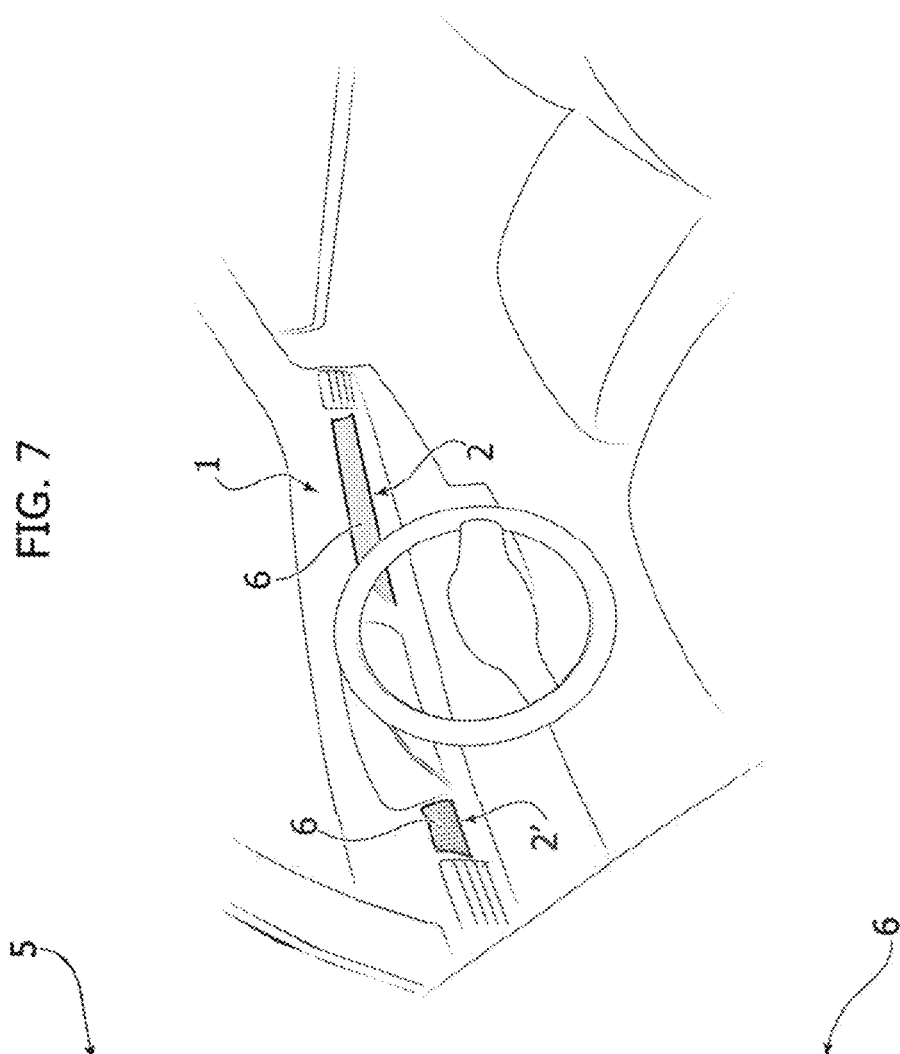
Figure 5:
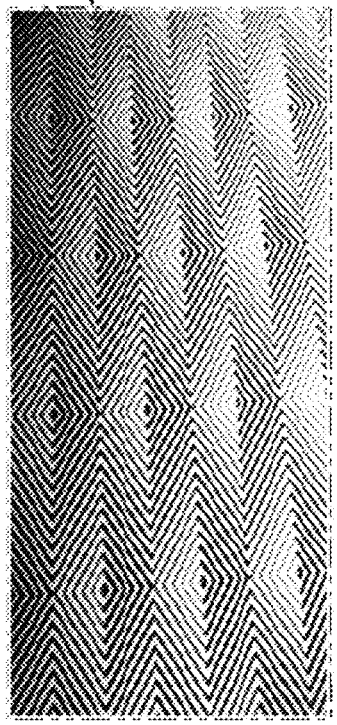
Figure 6:
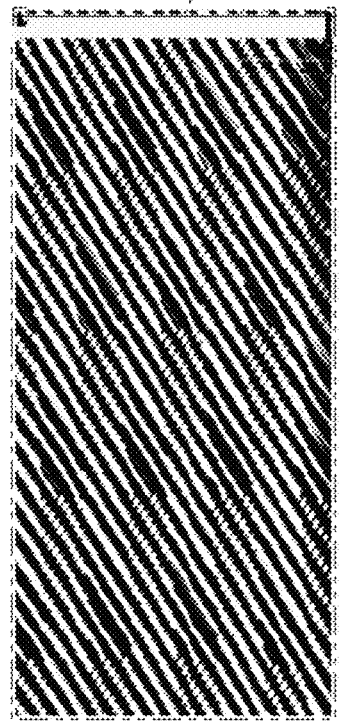

Further characteristics and advantages of the invention will become apparent from the description that follows with reference to the attached drawings, provided purely by way of non-limiting example, wherein:

FIG. 1 is a perspective view of a motor-vehicle interior component, in particular, an instrument-holder dashboard, according to a preferred embodiment, FIGS. 2, 3 are schematic exploded perspective views of the dashboard of the previous figure, FIG. 4 is a schematic view illustrating different materials forming a decorative panel illustrated in the previous figures, FIGS. 5, 6 are schematic views illustrating preferred embodiments according to the previous figures, and FIG. 7 is a further perspective view illustrating the embodiment of FIG. 1.

DETAILED DESCRIPTION OF THE INVENTION

In the following description, various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

Reference 1 indicates—as a whole—a motor-vehicle interior component according to the invention. In the attached drawings, the component 1 is a motor-vehicle instrument-holder dashboard, which is mounted, during use, on a suitable support structure (not shown) carried by a portion of the motor-vehicle frame (not shown). As is well known, the instrument-holder dashboard extends across the entire width of the motor-vehicle passenger compartment, and is modeled to perform various functions, including making the instrument panel available for use, various push-button panels and adjustment cursors, the ventilation vents, the radio/satellite navigation system, etc.

As illustrated in the exploded view of FIG. 2, the instrument panel 1 essentially comprises a shell 8, preferably made of polyurethane material, which is provided with suitable fastening elements, such as pins and centering elements, capable of allowing the correct positioning and fastening of the shell 8 on a support structure.

The shell 8 may be formed in one piece or from several parts suitably coupled together. By way of non-limiting example, FIG. 2 shows a first shell comprising a passenger side portion 9, a central compartment 14 arranged for the installation of an infotainment system, a central portion 9', while FIG. 3 shows a second shell defining a peripheral portion on the guide side 9".

According to the invention, the instrument-holder dashboard comprises a decorative panel 2 formed by a shaped body of plastic material applicable to the shell 8, having an aesthetic, finishing function. Again with reference to the passenger side and driver's side configuration of the shell, it should be noted that the dashboard comprises a first portion of decorative panel 2 (passenger side), a second portion of decorative panel 2' (central) and a third portion of decorative panel 2" (driver's side), arranged for coupling with the respective shell portions 9, 9', 9".

Again with reference to FIGS. 2, 3, it should be noted that the motor-vehicle dashboard comprises backlighting means 7 associated with the back of the decorative panel 2, 2', 2". In the following description, the characteristics of the backlighting means 7 and their function are illustrated in detail.

According to the present invention, the decorative panel 2, 2', 2" has a configuration of multi-layer materials. FIG. 4 is a schematic view showing the composition of the different materials forming the decorative panel 2, 2', 2", according to a preferred embodiment.

The decorative panel 2, 2', 2" has an outer surface 3, exposed to view, at least partially transparent to light, the back of which is associated with a support layer 4 having a first aesthetic pattern 5 on a first face facing the visible surface 3 and a second aesthetic pattern 6 on a second face opposite the first face.

In accordance with the present invention, the backlighting means 7 associated with the back of the decorative panel 2, 2', 2" can be activated to illuminate the second aesthetic pattern 6, thus making this second aesthetic pattern 6 visible through the surface exposed to the view 3. As said, the support layer 4 is made of a transparent material. The second aesthetic pattern 6 is visible along the visible surface 3 through transparent portions of the first aesthetic pattern 5. According to this configuration, the dashboard of the motor-vehicle 1 has a peculiar characteristic: in daylight conditions, the visible surface 3 displays the first aesthetic pattern 5 (FIGS. 1, 5), while in the condition of activated backlighting means 7, (for example, in situations of poor lighting in the passenger compartment), the surface exposed to the view 3 allows the second illuminated aesthetic pattern 6 to be displayed (FIGS. 6, 7). In other words, the decorative panel 2, 2', 2" according to the invention is characterized in that the second aesthetic pattern 6 is absolutely not visible when it is not illuminated by a light source located behind the panel, presenting said panel with an external surface corresponding to the first aesthetic model 5.

As previously indicated, the first and second aesthetic patterns 5, 6 are reproduced on opposite faces of the support layer 4 (FIG. 4). This configuration may be made in the form of a thermoformed film 13 according to a "hot stamping" technology.

In one or more embodiments, the support layer 4 is made of a thermoformed transparent plastic material (for example, polycarbonate) with a first visible finish, which creates a particular aesthetic effect (for example, of the "metallic" type), but semi-permeable to light, and a second finish shown on the opposite side designed to be viewed using special lighting.

In one or more embodiments, such as the one illustrated in FIG. 4, the first aesthetic pattern 5 is obtained by deposition of an opaque ink layer on the first face of the support layer 4, by means of a silk-screen printing method. As illustrated in FIG. 4, the layer of opaque ink (for example, black) has a discrete deposition with equidistant dots along the support layer 4, so as to alternate between dark areas, which block the passage of light and areas without ink wherein the light may pass through.

In one or more embodiments, the second aesthetic pattern 6 is obtained by composing superimposed layers of ink with different shades, spaced apart to obtain an alternation of portions that are at least partially transparent to light and dark portions, along the extension of the support layer 4. In one or more embodiments, these layers comprise a layer of black ink 6', a first layer of gray ink 6" with a first shade of gray and a second layer of gray ink 6''' with a shade different from the previous layer 6".

The ink layers 6', 6", 6''' are deposited with a particular geometric pattern through a screen printing method. Each layer 6', 6", 6''' may present a continuous deposition along the whole extension of the support layer 4 (see layer 6' in FIG. 4) or a discrete deposition with equidistant dots along the support layer 4 (see layers 6" and 6''' in FIG. 4).

With reference to the embodiment illustrated in FIG. 4, starting from the second face of the support layer 4, the ink layers are deposited as follows:
- a first layer of gray ink 6" deposited continuously along the support layer 4,
- a second layer of gray ink 6''' with a darker shade than the previous one, with deposition in equidistant intermittent spacing along the support layer 4,
- a layer of black ink 6', also with discrete dot deposition at equidistant intermittent spacing along the support layer 4.

Again with reference to the embodiment illustrated in FIG. 4, it should be noted that the alternating and equidistant areas of gray ink 6''' along the support layer 4 are of greater extent than those of the black ink layer 6'.

It should be noted that the succession of superimposed ink layers 6', 6", 6''', in combination with their spacing on the support layer 4, characterizes the second aesthetic pattern 6 allowing obtainment of an alternation of at least partially transparent portions in the light and dark portions along the extension of the visible surface 3. As an example, note that gray ink shades may be set to allow for 11% and 30% light transmissibility.

In one or more embodiments, the texture of the first aesthetic pattern 5 and/or of the second aesthetic pattern 6 is not the same along the extension of the decorative panel 2. For example, as illustrated in FIG. 5, the texture of the first aesthetic pattern 5 is faded along the extension of the decorative panel 2, 2', 2" from one side of the passenger compartment to the other. This may be achieved by varying the hue of a single layer of ink along the extent of the support layer 4.

As previously indicated, the support layer 4 is made of a thermoformed transparent plastic material (for example polycarbonate) with a first visible finish which creates a particular aesthetic effect, semi-permeable to light, and a second finish applied on the opposite side designed to be viewed using special lighting. The semi-transparent effect of the components may be obtained, for example, by means of deposition technology by "hot stamping" of a light-permeable support film.

The shaped body of the decorative panel 2, including the thermoformed film 13, may be made according to an "injection molded film" (FMI) technology, which provides for the injection of a molten plastic material 18 inside a mold, within which the substrate of plastic material 4 is arranged, with which the aesthetic patterns 5,6 created with a suitable ink are associated.

In one or more embodiments, the injected plastic material 18 intended to form the shaped body of the decorative panel 2, 2', 2" is a thermoplastic polymer, particularly polycarbonate.

In a preferred embodiment, the visible surface 3 associated with the first aesthetic pattern 5 gives a "metallic" type appearance and a "haptic" type feedback to the touch, or rather rough on contact.

According to a further preferred characteristic of the invention, on the back of the second aesthetic pattern 5 at least one further layer of material 17 is associated, substantially transparent, arranged to protect the ink layers 6', 6", 6''' of the second aesthetic pattern 6 during the plastic material injection step to form the shaped body of the decorative panel 2, 2' 2".

As previously indicated, the back-lighting means 7 are associated on the back of the decorative panel 2, 2', 2", which can be activated to illuminate and make visible the second aesthetic pattern 5 through the visible surface 3.

The backlighting means 7 can be made for example with optical fibers or alternatively with electroluminescent elements possibly with a thermoformed structure. In the second case, the backlighting means 7 may be of the type represented in the exploded view of FIG. 2: a light source 11, preferably consisting of one or more LEDs and including optics, feeds a light beam along a light guide body 10 associated with the back of the shaped body forming the decorative panel 2, 2', 2". In a preferred embodiment, the light guide body 10 is made of thermoplastic polymer, preferably polymethylmethacrylate.

The light guide body 10 comprises at least one connection portion 12 arranged to make the mechanical connection with the light source 11 and a transmissive body 19, i.e. at least partially transparent to light, which extends along the decorative panel 2, 2', 2". Preferably, the light guide body 10 is spaced substantially along the entire extension of the decorative panel 2, 2', 2", so as to illuminate the entire panel. The light source 11 may be integrated within a connector module 15 having centering pins 16 to be connected to the connection portions 12 of the light guide body 10. The light source 10 with the respective electrical connection cables are integrated inside the connector module 15.

Again with reference to the passenger side and driver side configuration of the dashboard shell, it should be noted that the light guide body comprises a first light guide portion 10 (passenger side), a second light guide portion 10' (central) and a third light guide portion 10" (guide side, illustrated in FIG. 3), arranged for coupling with the respective decorative panel portions 2, 2', 2". In this embodiment, the passenger side portion 10 and the driver side 10' can be equipped with respective light sources 11, 11'.

In one or more embodiments, the light source 11 is connected to an electronic actuation interface, which allows its activation, deactivation, intensity regulation and possibly the management of color change in a controlled or even automatic way. Preferably, the light source 11 is an RGB LED module configured to emit light beams of different colors. It should be noted that the color variation of the second aesthetic pattern 6 can be associated with a change of drive mode of the motor-vehicle itself (for example, from an economy mode to a sports mode).

As explained above, in the deactivated condition of the backlighting means 7, the visible surface 3 of the dashboard has an appearance corresponding to the first aesthetic pattern 5, while in the activated condition, the visible surface 3 displays the second aesthetic pattern 6 illuminated by a diffuse and suffused light.

Although the invention has been described with specific reference to an aesthetic/decorative element located along the instrument-holder dashboard, it is equally advantageously applicable to aesthetic/decorative elements located in different areas, for example, the inner panels of the side doors, or elsewhere.

Of course, the basic principles of the invention remaining the same, the construction details and embodiments may vary widely with respect to what has been described and illustrated purely by way of example, without thereby departing from the scope of the present invention as defined by the attached claims.

The invention claimed is:

1. A motor-vehicle interior component comprising:
   a decorative panel formed by a shaped body of plastic material,
   a support layer,
   wherein the decorative panel has a visible surface at least partially transparent to light, the visible surface comprising a back adjacent the support layer, the support layer having a first aesthetic pattern on a first face facing the visible surface, and a second aesthetic pattern on a second face opposite to said first face,
   wherein the visible surface, the first and the second aesthetic patterns and the support layer define a configuration of multi-layer materials comprising ink layers deposited on the support layer,
   wherein the first and second aesthetic patterns and the support layer form a film with dark, light-blocking portions and light transparent portions,
   backlighting means located on an opposite side of the decorative panel relative to the visible surface, the backlight means activatable to illuminate said second aesthetic pattern to make the second pattern visible along the visible surface through transparent portions of the first aesthetic pattern,
   in such a way that said first aesthetic pattern and said second aesthetic pattern are alternatively displayed from the outside of the component depending on whether the backlighting means are deactivated or activated.

2. A motor-vehicle interior component according to claim 1, wherein the first aesthetic pattern is obtained by depositing an opaque ink layer on the first face of the support layer.

3. A motor-vehicle interior component according to claim 2, wherein said opaque ink layer on the first face has an intermittent arrangement with equidistant spacing along the support layer, so as to alternate dark areas that are substantially light-blocking, and areas without ink wherein light can pass through.

4. A motor-vehicle interior component according to claim 1, wherein the second aesthetic pattern is obtained by a composition of several superimposed ink layers, with different shades, spaced to obtain an alternation of portions at least partially transparent to light and dark portions, along the extension of the support layer.

5. A motor-vehicle interior component according to claim 4, wherein said composition comprises a black ink layer, a first grey ink layer with a first grey shade and a second grey ink layer with a second grey shade.

6. A motor-vehicle interior component according to claim 5, wherein starting from the second face of the support layer, the ink layers are deposited in the following way and order:
   said first grey ink layer deposited continuously along the support layer,
   said second grey ink layer deposited with equidistant intermittent spacing along the support layer,
   said black ink layer deposited with equidistant intermittent spacing.

7. A motor-vehicle interior component according to claim 6, wherein the alternate and equidistant ink areas of the second grey ink layer are of larger extension than those of the black ink layer.

8. A motor-vehicle interior component according to claim 1, wherein the appearance of the first aesthetic pattern and/or of the second aesthetic pattern varies along the extension of the visible surface.

9. A motor-vehicle interior component according to claim 1, wherein the visible surface associated with the first aesthetic pattern have a metallic appearance and a haptic feedback to touch, or rather, rough on contact.

10. A motor-vehicle interior component according to claim 1, wherein the backlighting means comprise at least one light source connected to at least one light guide body associated with the back of the shaped body forming the decorative panel.

11. A motor-vehicle interior component according to claim 10, wherein the light guide body comprises at least one connecting portion configured for mechanically connecting the light source and a transmissive body at least partially transparent to light, which extends along the extension of the decorative panel.

12. A motor-vehicle interior component according to claim 10, wherein the light guide body is made of thermoplastic polymer.

13. A motor-vehicle interior component according to claim 10, wherein the light source is an RGB LED module configured to emit light beams of different colors.

14. A motor-vehicle interior component according to claim 1, wherein the component is an instrument-holder dashboard.

15. A motor-vehicle interior component according to claim 14, wherein the dashboard comprises a first decorative panel portion on the passenger side, a second decorative panel portion located centrally and a third decorative panel portion on the driver side.

16. A method for producing a motor-vehicle interior component according to claim 1, comprising at least one production step according to an injection molded film technology.

17. A motor-vehicle interior component according to claim 12, wherein the thermoplastic polymer comprises polymethylmethacrylate.

* * * * *